(12) United States Patent
Fujita et al.

(10) Patent No.: US 9,779,002 B2
(45) Date of Patent: Oct. 3, 2017

(54) STORAGE CONTROL DEVICE AND STORAGE SYSTEM

(71) Applicant: FUJITSU LIMITED, Kawasaki-shi, Kanagawa (JP)

(72) Inventors: Kenichi Fujita, Nagoya (JP); Hidejirou Daikokuya, Kawasaki (JP); Yoshimasa Mishuku, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 114 days.

(21) Appl. No.: 14/740,347

(22) Filed: Jun. 16, 2015

(65) Prior Publication Data

US 2016/0026548 A1    Jan. 28, 2016

(30) Foreign Application Priority Data

Jul. 22, 2014   (JP) ................................ 2014-148786

(51) Int. Cl.
   *G06F 11/00*   (2006.01)
   *G06F 11/20*   (2006.01)
   *G06F 11/16*   (2006.01)

(52) U.S. Cl.
   CPC ...... *G06F 11/2082* (2013.01); *G06F 11/1658* (2013.01); *G06F 11/2071* (2013.01); *G06F 11/2092* (2013.01); *G06F 2201/85* (2013.01)

(58) Field of Classification Search
   CPC ............. G06F 11/1658; G06F 11/2071; G06F 11/2082; G06F 11/2092; G06F 2201/85
   See application file for complete search history.

(56) References Cited

U.S. PATENT DOCUMENTS

| | | | | |
|---|---|---|---|---|
| 6,052,797 A  * | 4/2000 | Ofek | ................... | G06F 11/2064 709/219 |
| 7,107,355 B2 * | 9/2006 | Bethmangalkar | . | H04L 29/12009 707/999.202 |
| 7,293,154 B1 * | 11/2007 | Karr | ................... | G06F 11/2082 711/202 |
| 7,415,488 B1 * | 8/2008 | Muth | ................... | G06F 11/2082 707/648 |
| 7,617,259 B1 * | 11/2009 | Muth | ................... | G06F 11/2058 |
| 7,680,839 B1 * | 3/2010 | Krishnamurthy | ... | G06F 11/1435 707/610 |
| 7,885,923 B1 * | 2/2011 | Tawri | ................... | G06F 11/2064 707/610 |
| 7,908,448 B1 * | 3/2011 | Chatterjee | ........... | G06F 11/2064 707/655 |

(Continued)

FOREIGN PATENT DOCUMENTS

| | | |
|---|---|---|
| JP | 2003-233518 | 8/2003 |
| JP | 2009-003499 | 1/2009 |
| JP | 2011-164800 | 8/2011 |

*Primary Examiner* — Joshua P Lottich

(74) *Attorney, Agent, or Firm* — Fujitsu Patent Center

(57) ABSTRACT

A control module that manages a segment to which data is written implements write processing and resynchronization processing using a bitmap managed for each LUN. In other words, the control module stores the bitmap for the managed LUN in a bitmap storage unit. A mirror LUN control unit sets a corresponding portion of the bitmap to 1, controls data write to a target segment and a mirror segment, and resets the bitmap to 0 when the data write to both of the segments is complete. A resynchronization control unit refers to the bitmap storage unit to perform the resynchronization processing.

6 Claims, 9 Drawing Sheets

(56) References Cited

U.S. PATENT DOCUMENTS

| | | | |
|---|---|---|---|
| 7,979,396 B1* | 7/2011 | Krishnamurthy | G06F 17/30575 707/655 |
| 8,046,548 B1* | 10/2011 | Chatterjee | G06F 11/2064 707/655 |
| 2001/0049749 A1* | 12/2001 | Katsuragi | G06F 11/2082 709/248 |
| 2003/0126107 A1 | 7/2003 | Yamagami | |
| 2003/0126388 A1* | 7/2003 | Yamagami | G06F 11/2058 711/162 |
| 2003/0177306 A1* | 9/2003 | Cochran | G06F 11/2082 711/114 |
| 2003/0177321 A1* | 9/2003 | Watanabe | G06F 11/2058 711/161 |
| 2004/0250034 A1* | 12/2004 | Yagawa | G06F 11/2058 711/162 |
| 2004/0260970 A1* | 12/2004 | Beardsley | G06F 11/2066 714/6.12 |
| 2005/0081091 A1* | 4/2005 | Bartfai | G06F 11/2058 714/6.31 |
| 2005/0102553 A1* | 5/2005 | Cochran | G06F 11/2074 714/6.12 |
| 2005/0160248 A1* | 7/2005 | Yamagami | G06F 3/0619 711/170 |
| 2005/0198452 A1* | 9/2005 | Watanabe | G06F 11/2064 711/162 |
| 2005/0256972 A1* | 11/2005 | Cochran | H04L 69/329 709/245 |
| 2006/0015946 A1* | 1/2006 | Yagawa | G06F 11/2056 726/32 |
| 2006/0075148 A1* | 4/2006 | Osaki | G06F 11/2082 710/5 |
| 2007/0088924 A1* | 4/2007 | Jean-Denis | G06F 11/2082 711/162 |
| 2008/0177962 A1* | 7/2008 | Bitar | G06F 11/2082 711/162 |
| 2008/0244172 A1* | 10/2008 | Kano | G06F 11/2069 711/112 |
| 2008/0320051 A1 | 12/2008 | Murotani et al. | |
| 2009/0055507 A1* | 2/2009 | Oeda | G06F 9/4856 709/216 |
| 2009/0070528 A1* | 3/2009 | Bartfai | G06F 11/2082 711/114 |
| 2009/0313428 A1* | 12/2009 | De Jong | G06F 11/2058 711/114 |
| 2011/0197040 A1 | 8/2011 | Oogai et al. | |

* cited by examiner

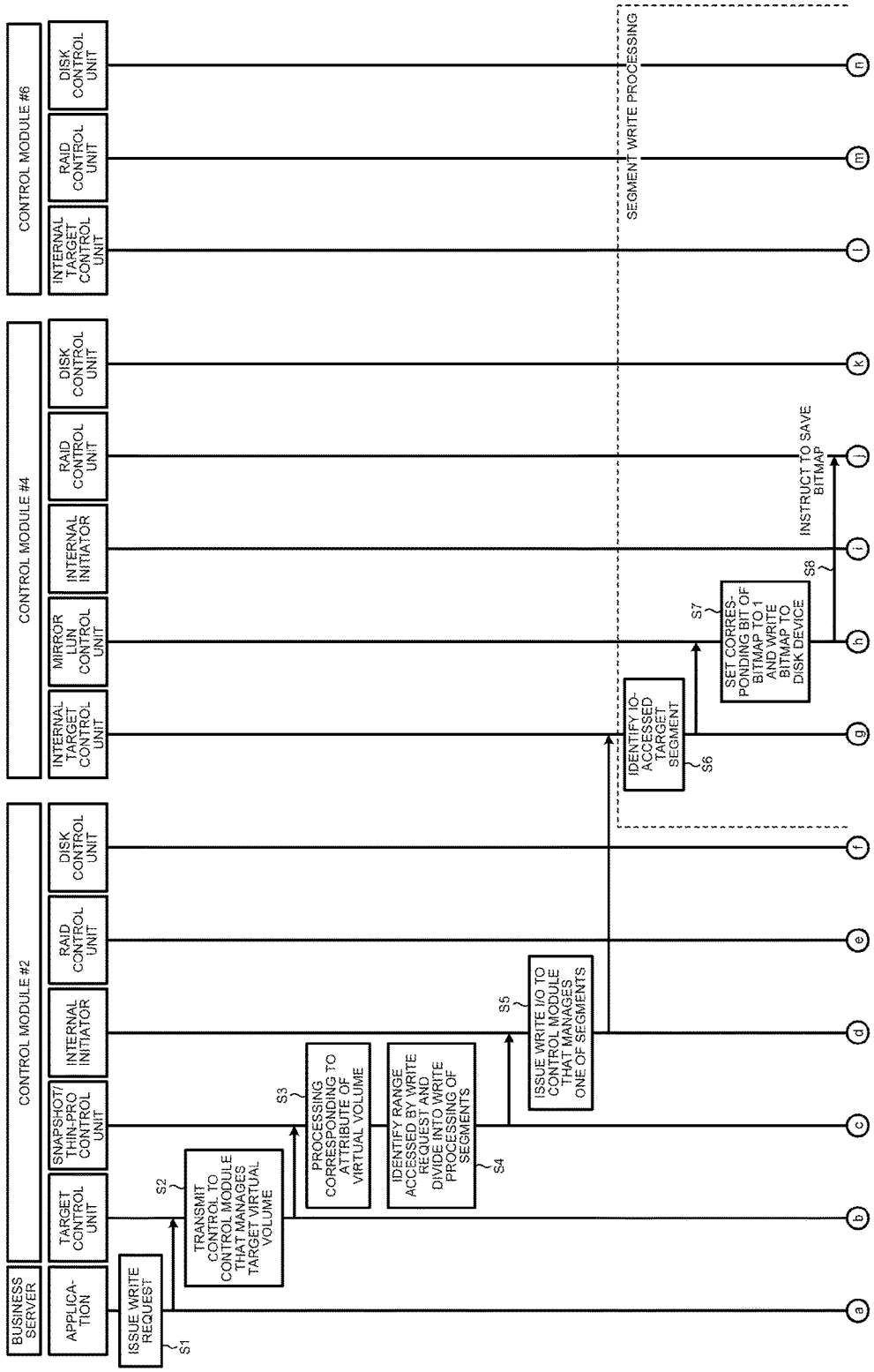

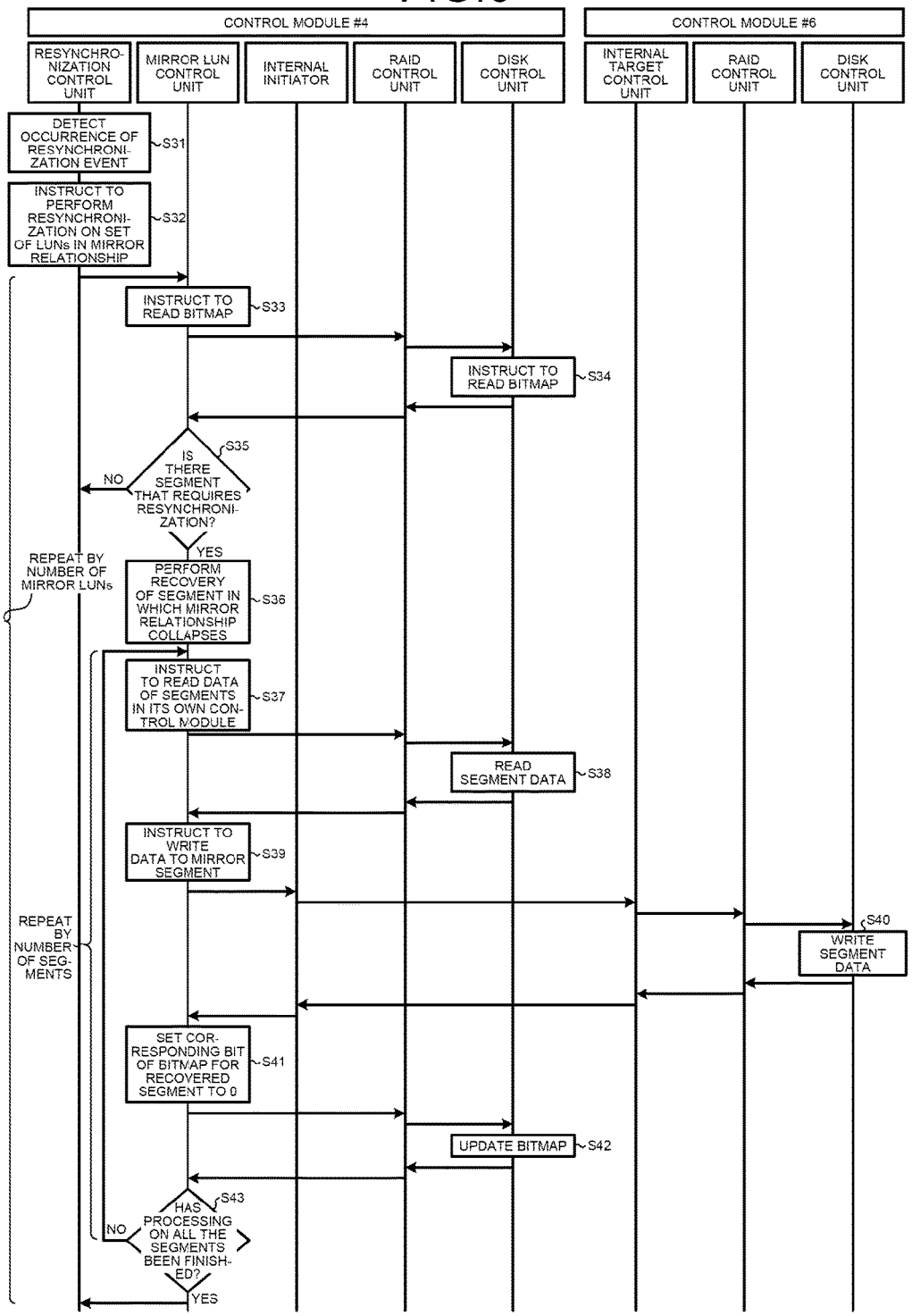

FIG. 8
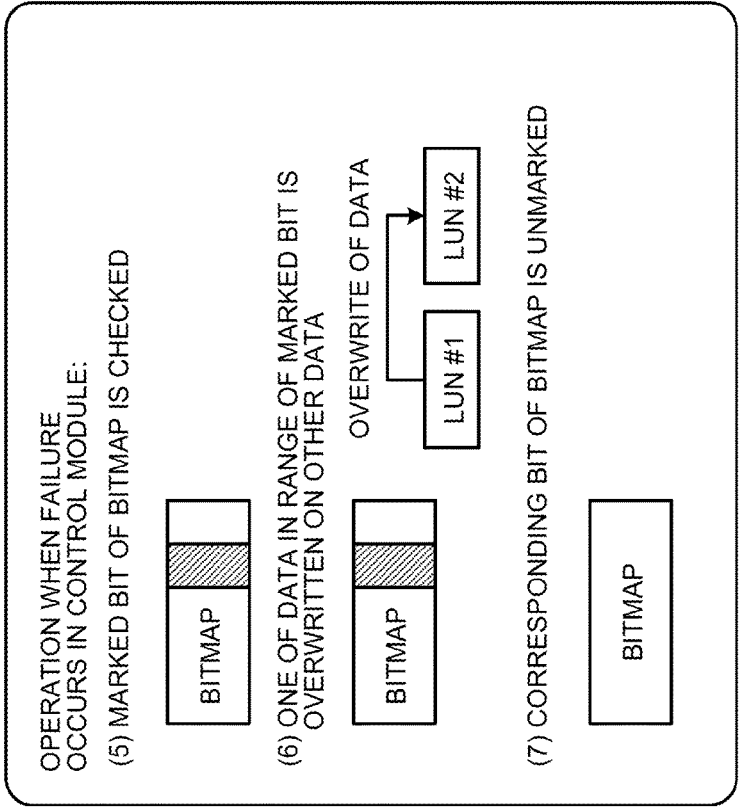
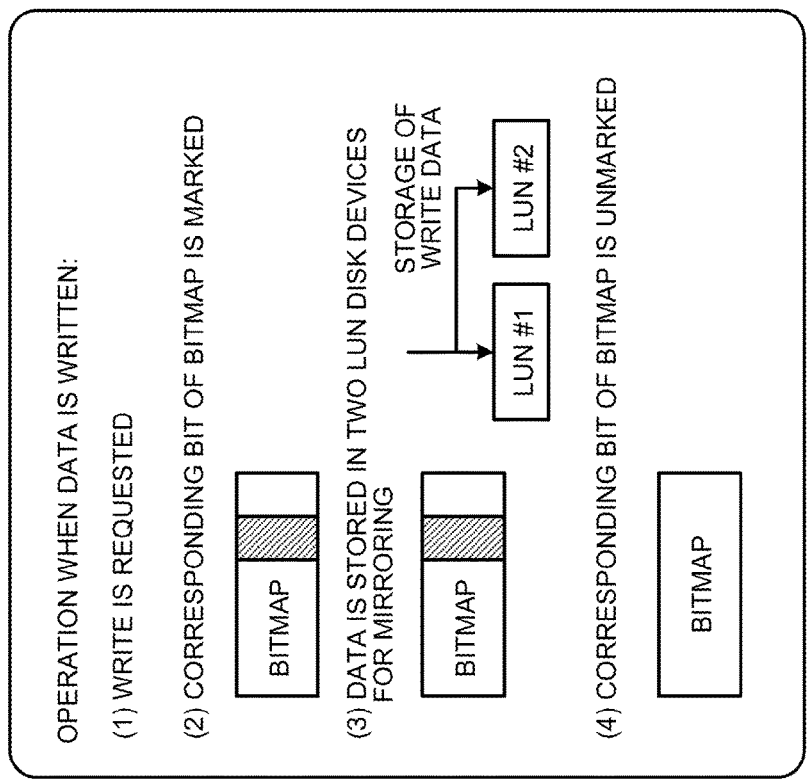

STORAGE CONTROL DEVICE AND STORAGE SYSTEM

CROSS-REFERENCE TO RELATED APPLICATION(S)

This application is based upon and claims the benefit of priority of the prior Japanese Patent Application No. 2014-148786, filed on Jul. 22, 2014, the entire contents of which are incorporated herein by reference.

FIELD

The embodiment discussed herein is directed to a storage control device and a storage system.

BACKGROUND

A storage system configured with a plurality of housings each storing a storage device such as a hard disk drive (HDD) stores data multiplied by mirroring between housings (inter-housing mirroring) and includes Just Resynchronization Mechanism (JRM). The JRM is a function for performing, when data between mirrorings become a mismatch due to a failure of a storage device, resynchronization processing on the data and resynchronizing the data.

FIG. 8 is a diagram for explaining JRM. As illustrated in FIG. 8, the JRM includes an operation when data are written and an operation when a failure occurs in a control module. The operation when data are written is such that the control module for controlling a storage system marks, when "write" is requested (1), a corresponding bit of a bitmap (for example, "1" is written) (2).

The bitmap mentioned here represents a map indicating whether each segment of the storage device is during write processing. In the bitmap, one bit is associated with one segment, and the bit corresponding to the segment during write processing is marked. The size of one segment is 256 MB.

The control module stores the data in storage devices of two logical unit numbers (LUNs) as targets for mirroring (3). When the storage of the data to the two storage devices is complete, the control module unmarks the corresponding bit of the bitmap (for example, "1" that has been written to the corresponding bit is changed to "0") (4).

In the operation when a failure occurs in the control module, the control module checks a marked bit of the bitmap (5), and overwrites one of data in a range corresponding to the marked bit on the other one (6). In this case, it is not important that data of either one of data is overwritten on the other one, but priority is given to avoidance of mismatch between the data. The control module then unmarks the corresponding bit (7).

In this way, the control module identifies the segment that is in the middle of write processing, when the failure occurs, by using the bitmap and overwrites one of the data for the identified segment on the other data which are in a mirror relationship, so that the data can be resynchronized.

Each housing has two or more control modules, and each control module that receives a write request from a business server using the storage system is in charge of the control of marking a corresponding bit of the bitmap.

There is a conventional technology in which a first logical volume is provided in a first storage, a second logical volume obtained by copying the first logical volume and a third logical volume obtained by copying the second logical volume are provided in a second storage, and the first logical volume is recovered from the third logical volume.

There is another conventional technology in which a management table is provided in each node of a first site and a second site where a remote copy is preformed and, when the first site is stopped due to a failure, a logical directory that the first site provides to a client is reproduced in the second site by using the management table.

There is another conventional technology in which status information of grouped data is managed for each group by a storage system that copies data from a copy source housing to a copy destination housing and the consistency of the data is thereby managed by a storage device.

Patent Document 1: Japanese Laid-open Patent Publication No. 2003-233518
Patent Document 2: Japanese Laid-open Patent Publication No. 2009-3499
Patent Document 3: Japanese Laid-open Patent Publication No. 2011-164800

Recently, the processing of various operations is being implemented in a cloud environment, and a storage system suitable for speed-up and distribution of the processing of the operations is required. The configuration of the storage system includes an active-standby method and an active-active method.

The active-standby method mentioned here represents a method in which only one active control module receives an access request from a business server using the storage system. On the other hand, the active-active method mentioned here represents a method in which any control module can receive an access request from a business server. The active-active method has advantages such that a load of a primary control module can be distributed to a secondary control module and a recovery from the failure can be speedily performed and the like although the processing performed on the access request from the business server becomes complicated. Therefore, the active-active storage system tends to be increased.

However, in the active-active storage system, the management of an equivalent state between control modules becomes complicated, and this becomes an obstacle for implementation of a high-speed resynchronization function.

SUMMARY

According to an aspect of an embodiment, a storage control device includes a map information storage unit that stores map information used for resynchronization processing of data to which mirror control is performed in unit of predetermined storage management of a storage device; and a mirror control unit that performs the mirror control between a first housing that stores a first storage device to which the storage control device controls an access and a second housing that stores a second storage device to which other storage control device controls an access, and controls, at a time of data write, the data write to the first storage device and the second storage device using the map information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5A is a first diagram of a sequence of write processing;

FIG. 6 is a diagram of a sequence of resynchronization processing of a mirror volume;

FIG. 8 is a diagram for explaining JRM.

DESCRIPTION OF EMBODIMENT(S)

Preferred embodiments of the present invention will be explained with reference to accompanying drawings. It should be noted that the embodiments do not limit the disclosed technology.

Figure 1:
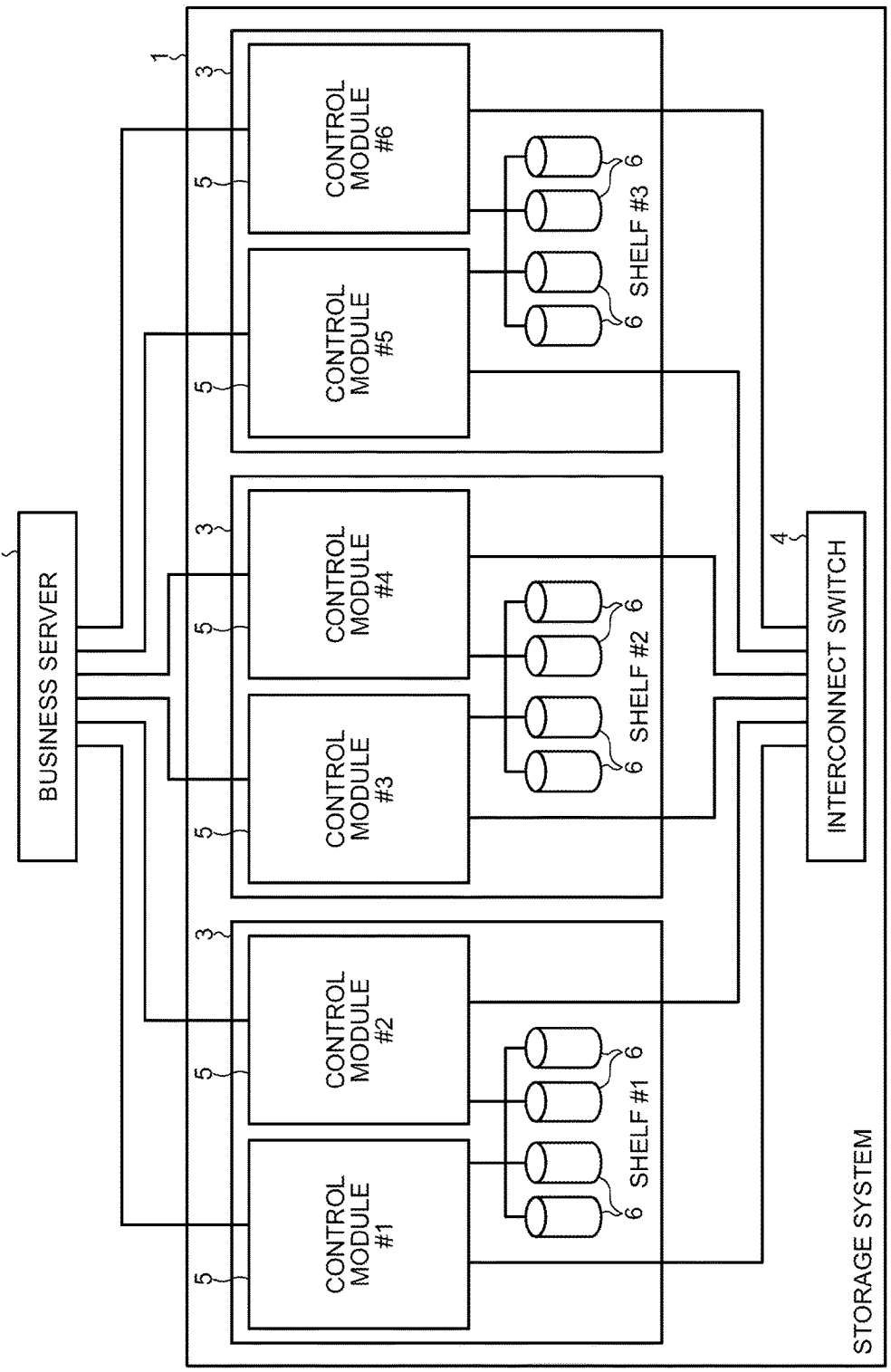
FIG. 1 is a diagram of a configuration of a storage system according to an embodiment.

First of all, a configuration of a storage system according to an embodiment will be explained below. FIG. 1 is a diagram of the configuration of the storage system according to the embodiment, and the storage system according to the embodiment is an active-active storage system. As illustrated in FIG. 1, a storage system 1 includes three shelves 3: shelf #1, shelf #2, and shelf #3, and an interconnect switch 4. For the sake of convenience of explanation, only the three shelves 3 are illustrated, but the storage system 1 is a scale output type device and may therefore include four or more shelves 3.

The shelf 3 is a housing that stores two control modules 5 and four disk devices 6. The control module 5 controls an access to the disk device 6 based on an access request from a business server 2. Each of the control modules 5 being a control module #1 to a control module #6 can receive an access request from the business server 2 and can access the disk device 6 stored in other shelf 3 via other control module 5.

The disk device 6 is a device that stores data used by the business server 2. The disk device 6 is a storage device configured with one or more hard disk drives (HDDs) or solid state drives (SSDs), but a storage device configured with one or more flash memories or so may be used instead of the disk device. For the sake of convenience of explanation, the four disk devices 6 are illustrated herein, but the shelf 3 may include two or less, or five or more disk devices 6. The interconnect switch 4 is a switch for connecting the control modules 5.

Figure 2:
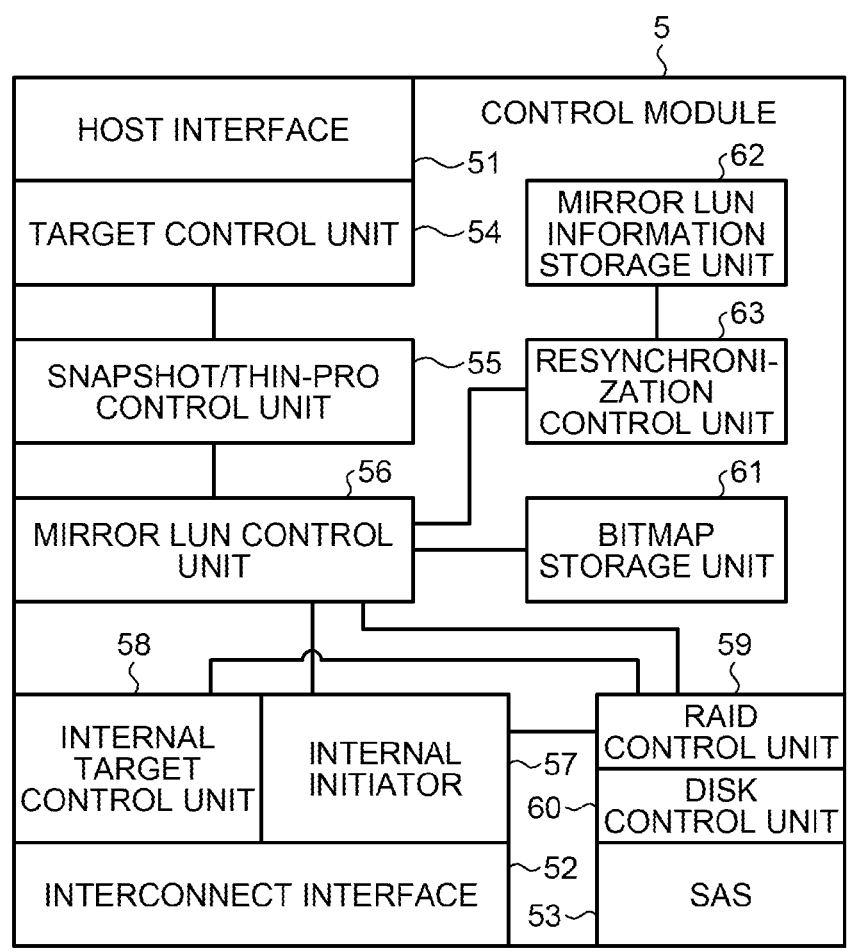
FIG. 2 is a diagram of a configuration of a control module.

FIG. 2 is a diagram of a configuration of the control module 5. As illustrated in FIG. 2, the control module 5 includes a host interface 51, an interconnect interface 52, a serial-attached SCSI (SAS) 53, a target control unit 54, a snapshot/thin-pro control unit 55, and a mirror LUN control unit 56. The control module 5 also includes an internal initiator 57, an internal target control unit 58, a RAID (Redundant Array of Inexpensive Disks) control unit 59, and a disk control unit 60. The control module 5 further includes a bitmap storage unit 61, a mirror LUN information storage unit 62, and a resynchronization control unit 63.

The host interface 51 is an interface with the business server 2, receives an access request to the storage system 1 from the business server 2, and responds the result of access processing to the business server 2. The interconnect interface 52 is an interface with the interconnect switch 4, and transmits and receives data or a command to and from the interconnect switch 4. The SAS 53 is an interface with the disk device 6, and transmits and receives data or a command to and from the disk device 6.

The target control unit 54 is a module that discloses a virtual volume such as a standard volume, a thin provisioning volume, and a mirror volume to the business server 2, and that receives an access to a corresponding volume. The thin provisioning volume mentioned here represents a volume to which a physical volume is allocated when data is actually written, and the mirror volume is a volume that stores mirror data. The snapshot/thin-pro control unit 55 creates snapshots and controls thin provisioning.

The mirror LUN control unit 56 is a module that controls input/output (I/O) to/from a managed LUN and manages segments in a mirror relationship in the unit of LUN, and controls management of a bitmap indicating an equivalent state for maintaining equivalence and controls an access to the segments in the mirror relationship. When a control module 5 breaks down, the LUN managed by the control module 5 that breaks down is succeeded to other control module 5.

The internal initiator 57 is a module that makes a transparent access to the disk device 6 disposed in other control module 5, like a disk device 6 disposed in its own control module 5. The internal target control unit 58 is a module that controls so as to enable a transparent access to the disk device 6 disposed in the own control module 5 from the internal initiator 57 in the other control module 5. In other words, the internal initiator 57 can issue a write request as is the business server 2, and the internal target control unit 58 can receive the write request and issue a write command to the disk device 6.

The RAID control unit 59 is a module that performs RAID control on the disk device 6 disposed in the own control module 5. The disk control unit 60 controls an access to the disk device 6 via the SAS 53.

The bitmap storage unit 61 stores a bitmap related to the LUN allocated to the own control module 5. The bitmap is once stored in the disk device 6, but is read from the disk device 6 to be stored in the bitmap storage unit 61, and is accessed. When the bitmap storage unit 61 is updated, the information for the bitmap storage unit 61 is written to the disk device 6.

The mirror LUN information storage unit 62 stores information for the LUNs in a mirror relationship. Specifically, the mirror LUN information storage unit 62 stores a set of LUNs in a mirror relationship. The resynchronization control unit 63 refers to the mirror LUN information storage unit 62 when a resynchronization event occurs, and performs processing for resynchronizing the LUNs in the mirror relationship. The resynchronization event mentioned here is a failure of the control module 5 and the like.

Figure 3:
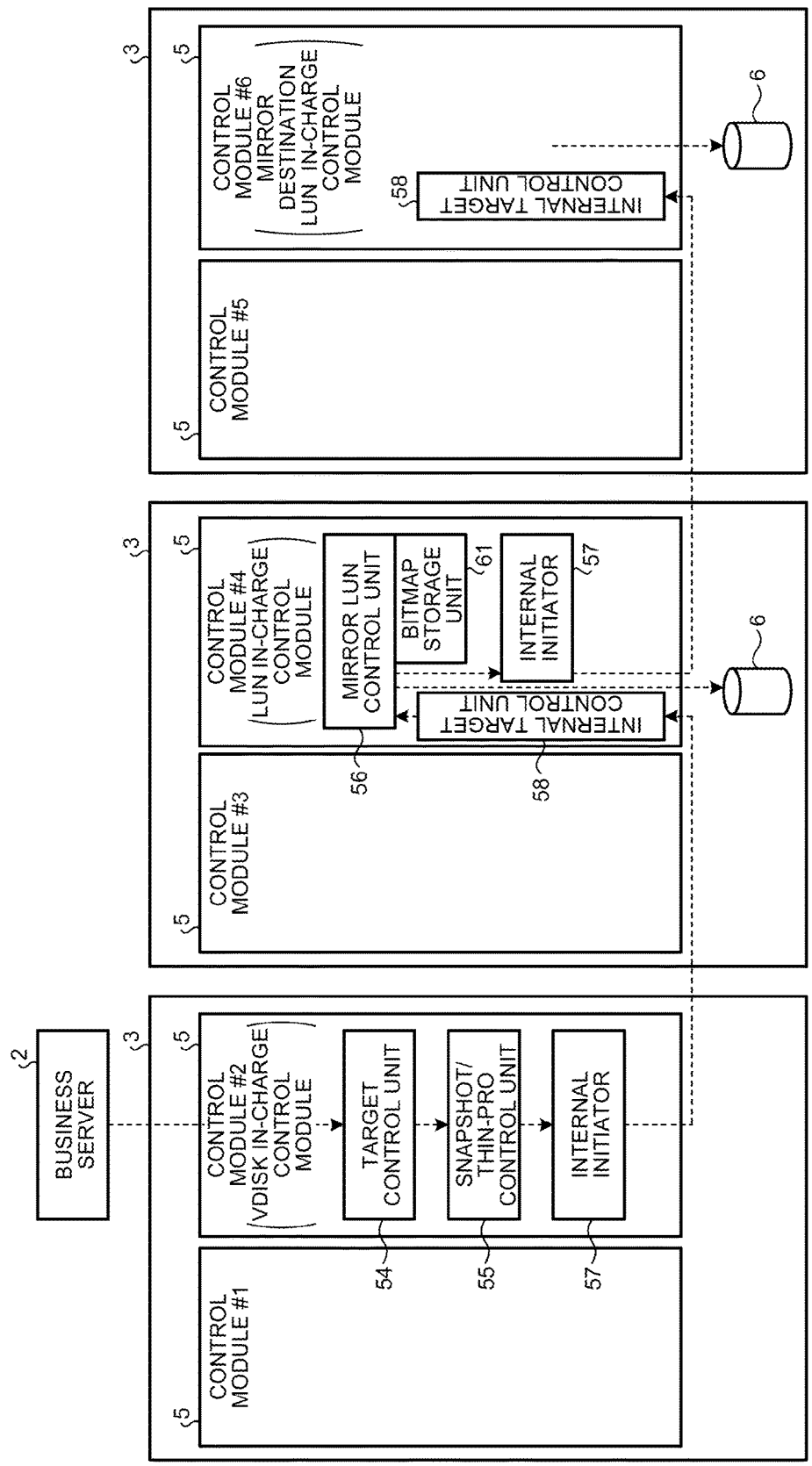
FIG. 3 is a diagram for explaining inter-housing mirroring according to the embodiment.

Inter-housing mirroring executed across housings according to the embodiment will be explained next. FIG. 3 is a diagram for explaining the inter-housing mirroring according to the embodiment. FIG. 3 represents a case where the control module #2 receives a write request from the business server 2, the disk device 6 of the LUN corresponding to the write request is accessed by the control module #4, and the disk device 6 that stores mirror data is accessed by the control module #6.

When receiving the write request from the business server 2, the target control unit 54 of the control module #2 transmits the control to the control module that manages a virtual volume as a target of the write request. The control module that manages the virtual volume as a target of the write request is assumed to be the control module #2. The control module that manages the virtual volume is represented by a VDISK in-charge control module in FIG. 3.

The snapshot/thin-pro control unit 55 that receives the control from the target control unit 54 transmits the control to the mirror LUN control unit 56 of the control module #4 that controls the disk device 6 of the LUN allocated to the virtual volume as a target of the write request. At this time, the snapshot/thin-pro control unit 55 transmits the control to the mirror LUN control unit 56 of the control module #4 via the internal initiator 57 of the control module #2 and the internal target control unit 58 of the control module #4. Then, the mirror LUN control unit 56 of the control module #4 uses the bitmap managed for each LUN to control so that the data is written to the disk device 6 controlled by the control module #4 being a mirror source and to the disk device 6 controlled by the control module #6 being a mirror destination. At this time, the mirror LUN control unit 56 of the control module #4 controls so as to write the data to the disk device 6 controlled by the control module #6 via the internal initiator 57 of the control module #4 and the internal target control unit 58 of the control module #6.

In this way, the control module 5 manages the bitmap indicating the equivalent state for each LUN of which each module is in charge, which enables the active-active storage system 1 to implement the JRM. In the active-active storage system 1, all the active control modules receive an access request from the business server 2, so that the bitmap for each virtual volume can also be owned in all the control modules.

However, by owning the bitmap in the all the active control modules, the capacity of the bitmap is increased and communication between the control modules is required to acquire the update content of the bitmap updated by other control module, which leads to occurrence of overhead in the bitmap processing. Moreover, if the scale of a scale-out-type storage system is increased more, the overhead becomes more significant. The storage system 1 according to the embodiment can minimize the capacity of the bitmap for the JRM, eliminate unnecessary communication between control modules, and suppress performance degradation.

For the bitmap, the storage system 1 according to the embodiment prevents a bit of a different LUN from being put in one block of the disk device 6. Therefore, the control module reads a bitmap of a different LUN from a different block.

Figure 4:
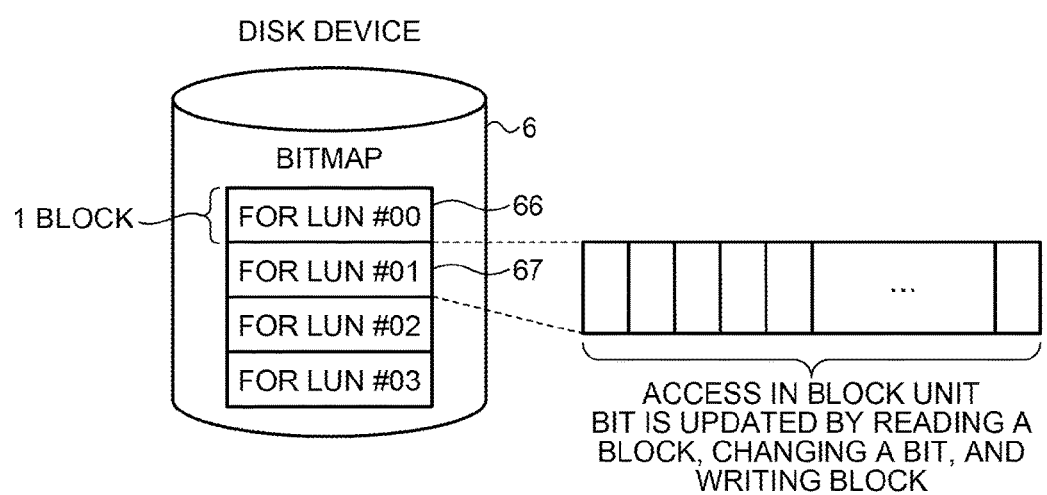
FIG. 4 is a diagram representing a relationship between a block and a bitmap for each LUN in a disk device.

FIG. 4 is a diagram representing a relationship between a block and a bitmap for each LUN in the disk device 6. As illustrated FIG. 4, only bits of the bitmap for LUN #00 are contained in a block 66, and only bits of the bitmap for LUN #01 are contained in a block 67. Here, the block is a unit of access to the disk device 6, and one block is 4096 bytes or 512 bytes.

Therefore, the storage system 1 according to the embodiment does not need to perform exclusive control when an access is made to the bitmap of a different LUN, which enables elimination of the overhead due to the exclusive control at the time of access to the bitmap.

An operation of a bit of LUN in one block is an operation of reading one block from the disk device 6, changing one bit, and then writing the one block back to the disk device 6. For marking of a bit when the write is started, writing back to the disk device 6 is essential as sequence of processing. On the other hand, for unmarking of a bit when the write is ended, it may be configured to delete the mark only on the bitmap storage unit 61 and write it back to the disk device 6 at the time when another write is started. Although this method has a possibility that overwriting for resynchronization at the time of occurrence of a failure may be performed slightly redundantly, the disadvantage is not so large because it is during the failure. Conversely, the number of times of writings to the disk during usual write processing can be reduced, which has an advantageous effect that a normal operation becomes quicker.

Figure 5B:
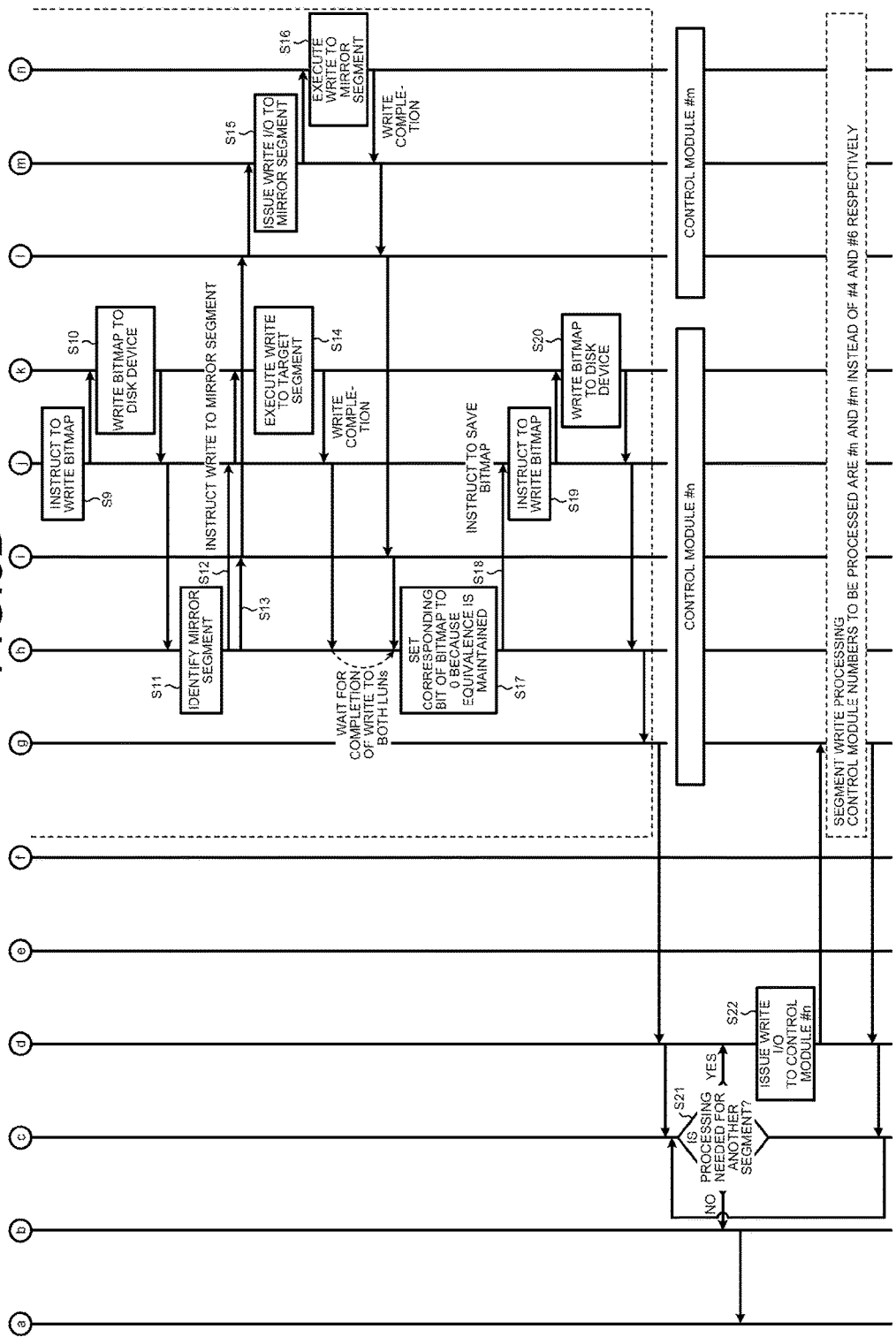
FIG. 5B is a second diagram of the sequence of write processing.

A sequence of write processing will be explained next. FIG. 5A and FIG. 5B are diagrams of a sequence of write processing. In FIG. 5A and FIG. 5B, the control module #2 receives the write request from the business server 2. An initial segment as a target of the write request is in the disk device 6 controlled by the control module #4, and a segment that stores mirror data is in the disk device 6 controlled by the control module #6.

As illustrated in FIG. 5A, an application running on the business server 2 issues a write request to the control module #2 (Step S1). Then, the target control unit 54 of the control module #2 receives the write request and transmits the control to the snapshot/thin-pro control unit 55 of the control module (herein, control module #2) that manages the virtual volume as a target of the write request (Step S2).

The snapshot/thin-pro control unit 55 performs snapshot processing and thin-provisioning processing corresponding to the attribute of the virtual volume (Step S3). The snapshot/thin-pro control unit 55 then identifies a range of segments accessed by the write request in the disk device of the LUN allocated to the virtual volume, and divides into write processing of segments (Step S4).

The snapshot/thin-pro control unit 55 instructs the internal initiator 57 so as to issue write I/O to the control module that manages one of the segments, and the internal initiator 57 issues the write I/O to the control module #4 (Step S5).

Then, the internal target control unit 58 of the control module #4 receives the write I/O and identifies the I/O-accessed target segment (Step S6). The mirror LUN control unit 56 sets the corresponding bit of the bitmap to 1, and writes the bitmap to the disk device 6 (Step S7).

That is, the mirror LUN control unit 56 instructs the RAID control unit 59 to save the bitmap (Step S8), and the RAID control unit 59 instructs the disk control unit 60 to write the bitmap thereto, as illustrated in FIG. 5B, (Step S9). The disk control unit 60 writes the bitmap to the disk device 6 (Step S10).

Then, when the write of the bitmap to the disk device 6 is complete, the mirror LUN control unit 56 identifies a mirror segment (Step S11), and instructs data write to the target segment and the mirror segment (Step S12 and Step S13).

The disk control unit 60 of the control module #4 performs the write to the target segment (Step S14). The internal initiator 57 of the control module #4 instructs the internal target control unit 58 of the control module #6 to write the data to the mirror segment. The internal target control unit 58 of the control module #6 then instructs the RAID control unit 59 to write the data to the mirror segment.

The RAID control unit 59 of the control module #6 issues the write I/O to the mirror segment (Step S15), and the disk control unit 60 performs the write to the mirror segment (Step S16).

The two writes are complete and this can make the equivalence be maintained, and therefore the mirror LUN control unit 56 sets the corresponding bit of the bitmap to 0, and writes the bitmap to the disk device 6 (Step S17). In other words, the mirror LUN control unit 56 instructs the RAID control unit 59 to save the bitmap (Step S18), and the RAID control unit 59 instructs the disk control unit 60 to write the bitmap (Step S19). The disk control unit 60 then writes the bitmap to the disk device 6 (Step S20).

When the write of the bitmap to the disk device 6 is complete, the snapshot/thin-pro control unit 55 determines whether the processing is needed for another segment because the write I/O is related to a plurality of segments (Step S21). As a result, when the processing is not needed for another segment, the target control unit 54 responds the completion of the write to the application.

Meanwhile, when the processing is needed for another segment, the snapshot/thin-pro control unit 55 instructs the internal initiator 57 to issue the write I/O to the control module that manages the corresponding segment, and the internal initiator 57 issues the write I/O to the control module #n (Step S22). The control module #n is a control module that manages the corresponding segment.

The control module #n performs the segment write processing similar to the processing at Step S6 to Step S20 together with a control module #m that manages a mirror segment. When the segment write processing is complete, the snapshot/thin-pro control unit 55 returns to Step S21.

In this way, the mirror LUN control unit 56 of the control module that manages the target segment cooperates with the internal initiator 57 and the internal target control unit 58 of the control module that manages the mirror segment, to thereby enable the inter-housing mirroring in the unit of segment.

A sequence of resynchronization processing of a mirror volume will be explained next. FIG. 6 is a diagram of the sequence of resynchronization processing of a mirror volume. A case where the resynchronization processing of the mirror volume is performed between the control module #4 and the control module #6 will be explained with reference to FIG. 6.

As illustrated in FIG. 6, when detecting occurrence of a resynchronization event (Step S31), the resynchronization control unit 63 refers to the mirror LUN information storage unit 62 to identify a mirror LUN in a mirror relationship with the LUN managed by the corresponding control module. The resynchronization control unit 63 instructs the mirror LUN control unit 56 to perform resynchronization on a set of LUNs in the mirror relationship (Step S32).

The mirror LUN control unit 56 then instructs the RAID control unit 59 to read a bitmap indicating a mirror state related to the set of LUNs in the mirror relationship (Step S33), and the RAID control unit 59 instructs the disk control unit 60 to read the bitmap. The disk control unit 60 reads the bitmap (Step S34) and transmits the read bitmap to the mirror LUN control unit 56 via the RAID control unit 59.

The mirror LUN control unit 56 determines whether there is a segment that requires resynchronization in the bitmap (Step S35). When there is not a segment that requires resynchronization, the mirror LUN control unit 56 returns to Step S33, and performs resynchronization on a next set of LUNs.

Meanwhile, when there is a segment that requires resynchronization, the mirror LUN control unit 56 performs recovery of the segment in which the mirror relationship collapses based on the bitmap (Step S36).

In other words, the mirror LUN control unit 56 instructs the RAID control unit 59 to read data of the segment in its own control module for the segment in which the mirror relationship collapses (Step S37), and the RAID control unit 59 instructs the disk control unit 60 to read the data. The disk control unit 60 then reads the segment data (Step S38), and the mirror LUN control unit 56 receives the segment data via the RAID control unit 59.

The mirror LUN control unit 56 instructs the internal initiator 57 to write the data to the mirror segment (Step S39), and the internal initiator 57 instructs the internal target control unit 58 of the control module #6 to write the data to the mirror segment. The internal target control unit 58 of the control module #6 instructs the RAID control unit 59 to write the data to the mirror segment.

The RAID control unit 59 then instructs the disk control unit 60 to write the data to the mirror segment, and the disk control unit 60 writes the data to the segment (Step S40). Then, when the data write is complete, the mirror LUN control unit 56 sets the corresponding bit of the bitmap for the recovered segment to 0 (Step S41).

The mirror LUN control unit 56 then instructs the RAID control unit 59 to update the bitmap stored by the disk device 6, and the RAID control unit 59 instructs the disk control unit 60 to update the bitmap. The disk control unit 60 updates the bitmap (Step S42).

Then, when the update of the bitmap is complete, the mirror LUN control unit 56 determines whether the processing on all the segments has been finished (Step S43). When there is any segment not yet to be processed, the mirror LUN control unit 56 returns to Step S37 and processes a next segment. Meanwhile, when the processing on all the segments has been finished, the mirror LUN control unit 56 returns to Step S33 and performs resynchronization on a next set of LUNs.

In this way, by performing the resynchronization processing on the LUNs managed by the control module itself, the storage system 1 can resynchronize between virtual volumes.

As explained above, in the embodiment, the control module 5 that manages a target segment to which the data is written implements the write processing and the resynchronization processing using the bitmap managed for each LUN. In other words, the control module 5 stores the bitmap for the managed LUN in the bitmap storage unit 61. The mirror LUN control unit 56 sets a corresponding portion of the bitmap to 1, controls data write to the target segment and the mirror segment, and resets the bitmap to 0 when the write to both segments is complete. The resynchronization control unit 63 refers to the bitmap storage unit 61 to perform the resynchronization processing.

Therefore, the resynchronization processing can be realized by the active-active storage system 1. The I/O to/from LUN is distributed to a plurality of LUNs through thin provisioning and wide striping, and therefore a LUN in-charge control module being in charge of LUNs manages the bitmap in the unit of LUN, to thereby enable distribution of the load between the control modules 5. Therefore, there is no need to share the bitmap among control modules.

In the embodiment, the internal initiator 57 of the control module 5 that manages the target segment to which the data is written and the internal target control unit 58 of the control module 5 that manages the mirror segment cooperatively control the data write to the mirror segment. Therefore, the control module 5 can write data to a segment managed by other control module 5 similarly to the segment managed by the own device.

In the embodiment, the storage system 1 stores only a bitmap related to one LUN in one block of the disk device 6. Therefore, there is no need to perform exclusive processing between LUNs when a bitmap is read, and the overhead due to the exclusive control can be eliminated.

In the embodiment, the control function of the control module 5 has been explained, but by implementing part of the control function of the control module 5 using software, a storage control program having the same function can be obtained. Therefore, a hardware configuration of a control module that executes the storage control program will be explained below.

Figure 7:
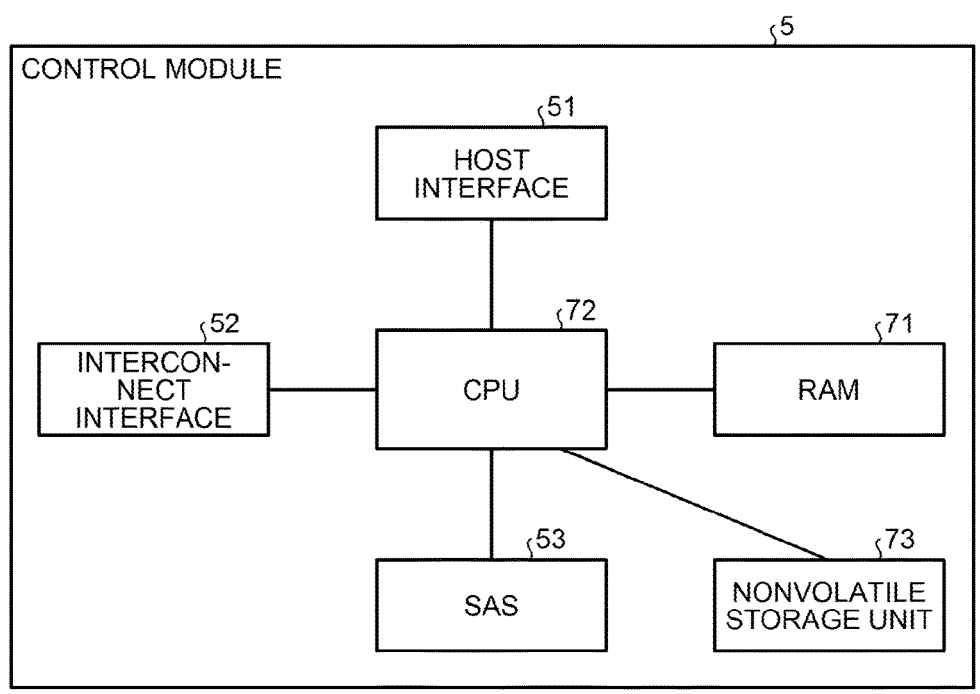
FIG. 7 is a diagram of a hardware configuration of a control module that executes a storage control program.

FIG. 7 is a diagram of the hardware configuration of a control module that executes the storage control program. A case where functions excluding the host interface 51, the interconnect interface 52, and the SAS 53 among the functions illustrated in FIG. 2 are implemented using software is explained herein.

As illustrated in FIG. 7, the control module 5 includes the host interface 51, the interconnect interface 52, the SAS 53, a random access memory (RAM) 71, a central processing unit (CPU) 72, and a nonvolatile storage unit 73.

The RAM 71 is a memory that stores programs and an intermediate result of a program in execution. The CPU 72 is a central processing unit that reads a program from the RAM 71 and executes the program. The nonvolatile storage unit 73 is a nonvolatile storage unit that stores programs, and is, for example, a hard disk drive (HDD) and a flash memory. The storage control program executed in the CPU 72 as one example of a computer is stored in the nonvolatile storage unit 73, is loaded into the RAM 71, and is executed by the CPU 72.

In the embodiment, the case where the mirroring processing and JRM are performed between two LUNs has been explained; however, the present invention is not limited thereto, and the present invention can also be applied to a case where the mirroring processing and JRM are performed among three or more LUNs in the same manner as above.

According to one embodiment, the resynchronization function can be realized by using the active-active storage system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A storage control device comprising:
a transmission controller that identifies a mirror controller that controls data write to a storage device from a plurality of mirror controllers in a storage system and transmits a data write control to the identified mirror controller;
a map information memory that stores map information used for resynchronization processing of data to which mirror control is performed in unit of predetermined storage management of a storage device; and
a mirror controller that, when the data write control is transmitted from a transmission controller of the storage control device or a transmission controller of other storage device in the storage system, performs the mirror control between a first housing that stores a first storage device to which the storage control device controls an access, and a second housing that stores a second storage device to which another storage control device controls an access, and controls, at a time of data write, the data write to the first storage device and the second storage device using the map information memory.

2. The storage control device according to claim 1, further comprising a resynchronization controller that refers to the map information memory, when a failure occurs, to perform the resynchronization processing.

3. The storage control device according to claim 1, further comprising an internal initiator that makes a transparent access to an area as the unit of predetermined storage management in the second storage device, wherein
the storage control device that controls an access to the second storage device includes an internal target controller that causes the corresponding storage control device to make a transparent access to the area as the unit of predetermined storage management in the second storage device, and
the mirror controller of the storage control device controls data write to the second storage device via the internal target controller using the internal initiator.

4. The storage control device according to claim 1, wherein the map information to be stored in the map information memory is stored in the first storage device including only one information as the unit of predetermined storage management in one area as a unit of access in the first storage device.

5. A storage system comprising a plurality of housings including a first housing that stores a first storage device and a first storage control device and a second housing that stores a second storage device and a second storage control device, the first storage control device includes
a transmission controller that identifies a mirror controller that controls data write to a storage device from a plurality of mirror controllers in the plurality of housings and transmits a data write control to the identified mirror controller;
a map information memory that stores map information used for resynchronization processing of data to which mirror control is performed in unit of predetermined storage management of a storage device; and
a mirror controller that, when the data write control is transmitted from a transmission controller of the first storage control device or a transmission controller of the other storage control device in the storage system, performs the mirror control between the first housing and the second housing, and controls, at a time of data write, the data write to the first storage device and the second storage device using the map information memory, and
the second storage control device includes
a write controller that controls data write to the second storage device under the control of the mirror controller of the first storage control device.

6. A non-transitory computer-readable storage medium having stored therein a program that causes a computer to execute a process comprising:
managing map information used for resynchronization processing of data to which mirror control is performed in unit of predetermined storage management to a memory; and
performing, by a mirror controller in a first housing, when a data write control is transmitted from a transmission controller that identifies a mirror controller to control the data write control to a storage device from a plurality of mirror controllers in a storage system, mirror control between the first housing that stores a first storage device to which the first storage control device controls an access and a second housing that stores a second storage device to which a second storage control device controls an access.

\* \* \* \* \*